(12) United States Patent
Pietsch et al.

(10) Patent No.: US 9,624,408 B2
(45) Date of Patent: Apr. 18, 2017

(54) METHOD FOR COAGULATING POLYMER DISPERSIONS USING EXPANDABLE MICROSPHERES

(71) Applicant: BASF SE, Ludwigshafen (DE)

(72) Inventors: Ines Pietsch, Speyer (DE); Lars Heckhoff, Gorxheimertal (DE); Meik Ranft, Bensheim (DE); Peter Schuler, Ludwigshafen (DE); Andrea Kuntz, Heidelberg (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 14/768,253

(22) PCT Filed: Mar. 12, 2014

(86) PCT No.: PCT/EP2014/054797
§ 371 (c)(1),
(2) Date: Aug. 17, 2015

(87) PCT Pub. No.: WO2014/154483
PCT Pub. Date: Oct. 2, 2014

(65) Prior Publication Data
US 2015/0376471 A1 Dec. 31, 2015

(30) Foreign Application Priority Data

Mar. 28, 2013 (EP) .................................... 13161695

(51) Int. Cl.
| | | |
|---|---|---|
| C08J 3/16 | (2006.01) | |
| C08J 9/32 | (2006.01) | |
| C08F 6/22 | (2006.01) | |
| C09J 133/08 | (2006.01) | |
| C09J 7/04 | (2006.01) | |
| C08F 220/10 | (2006.01) | |
| C08L 33/08 | (2006.01) | |

(52) U.S. Cl.
CPC ............... *C09J 133/08* (2013.01); *C08F 6/22* (2013.01); *C08F 220/10* (2013.01); *C08J 3/16* (2013.01); *C08J 9/32* (2013.01); *C08L 33/08* (2013.01); *C09J 7/041* (2013.01); *C08G 2170/40* (2013.01); *C08G 2170/80* (2013.01); *C08J 2203/22* (2013.01); *C08J 2207/02* (2013.01); *C08J 2333/04* (2013.01); *C09J 2201/606* (2013.01); *C09J 2205/11* (2013.01); *C09J 2400/283* (2013.01); *C09J 2433/00* (2013.01); *C09J 2475/00* (2013.01)

(58) Field of Classification Search
CPC .... C09J 133/08; C08F 6/22; C08J 3/16; C08J 9/32; C08J 2203/22; C08J 2207/02
See application file for complete search history.

(56) References Cited

U.S. PATENT DOCUMENTS

| | | | |
|---|---|---|---|
| 5,429,869 A | 7/1995 | McGregor et al. | |
| 5,650,107 A * | 7/1997 | Vetter | B29C 47/76 264/102 |
| 6,512,089 B1 * | 1/2003 | Hintzer | C08F 6/22 528/502 R |
| 6,740,373 B1 | 5/2004 | Swoboda et al. | |
| 2004/0209023 A1 * | 10/2004 | Swoboda | B32B 29/06 428/34.2 |
| 2006/0057365 A1 | 3/2006 | Swoboda et al. | |
| 2007/0135557 A1 * | 6/2007 | Brown | C08F 255/00 524/543 |
| 2009/0038855 A1 * | 2/2009 | Ravi | C09K 8/03 175/65 |
| 2010/0034975 A1 * | 2/2010 | Bohling | C08F 220/18 427/385.5 |

FOREIGN PATENT DOCUMENTS

| | | |
|---|---|---|
| EP | 0 740 264 A2 | 10/1996 |
| WO | WO 94/19400 A1 | 9/1994 |
| WO | WO 95/20020 A1 | 7/1995 |
| WO | WO 2004/113613 A1 | 12/2004 |
| WO | WO 2007/142593 A1 | 12/2007 |

OTHER PUBLICATIONS

Data Sheet fro Expancel 820 WU from Akzo Nobel. Songhan Plastics Technology. 2016.*
Kronos 4311 Data Sheet. 2015.*
International Search Report issued Jun. 11, 2014 in PCT/EP2014/054797 (with partial English language translation).

* cited by examiner

*Primary Examiner* — Kara Boyle
(74) *Attorney, Agent, or Firm* — Oblon, McClelland, Maier & Neustadt, L.L.P.

(57) ABSTRACT

Method for coagulating an aqueous polymer dispersion, where the aqueous polymer dispersion comprises at least one polymer in dispersion in aqueous phase, and also comprises thermally expandable, thermoplastic microspheres, the polymer dispersion is coagulated by energy input, and the coagulated composition is delivered via an outlet aperture, preferably in the form of a nozzle.

18 Claims, No Drawings

METHOD FOR COAGULATING POLYMER DISPERSIONS USING EXPANDABLE MICROSPHERES

The invention relates to a method for coagulating an aqueous polymer dispersion, where the aqueous polymer dispersion comprises polymer in dispersion in aqueous phase, and also comprises thermally expandable, thermoplastic microspheres, the polymer dispersion is coagulated by energy input, and the coagulated composition is delivered via an outlet aperture.

Aqueous adhesives, such as laminating adhesives and pressure-sensitive adhesives, are processed on the industrial scale on continuous coating lines. On these lines, the aqueous adhesives are applied in the desired layer thickness, using a suitable coating system, to a fast-moving carrier in web form, composed for example of paper or of a thermoplastic polymer (polymer film). This operation must be followed as soon as possible by drying. For that purpose, the coated carrier passes at the same speed through a drying apparatus. After drying, the carrier is generally wound up and later undergoes further processing to form self-adhesive articles, more particularly by being printed and cut to format. Drying necessitates a very large quantity of heat. During drying, the binder undergoes filming to form a coherent polymer film; the duration of drying and the drying conditions as well influence the quality of the resulting polymer film and hence also the subsequent performance properties of the self-adhesive articles.

Hotmelt adhesives, or simply hotmelts, contain no solvents and no water. They are termed 100% systems. Without subsequent chemical crosslinking, a hotmelt adhesive is of course heat-resistant only up to a maximum of its solidification temperature, and, without subsequent crosslinking, the bond strengths are limited. While these disadvantages can be negated by subsequent crosslinking, by using epoxide crosslinkers or isocyanate crosslinkers, for example, or using UV-crosslinkable hotmelt adhesives, such subsequent crosslinking involves increased cost and complexity in terms of time and/or apparatus.

It was an object of the present invention, therefore, to provide a method which as far as possible combines the specific advantages of the use of hotmelt adhesives on the one hand and of dispersion-based adhesives on the other, and that as far as possible minimizes the specific disadvantages at the same time. A particular object of the present invention, therefore, was that of providing a method for applying adhesive systems based on aqueous polymer dispersions that allows the polymer dispersions to be deliberately coagulated and yet not to exhibit any stability problems during synthesis—that is, to be stable with respect to premature coagulation prior to their application. The aim of the deliberate coagulation of the polymer dispersion is that bond strengths should be developed as far as possible with the same rapidity as in the case of a hotmelt system.

Surprisingly it has been found that with the method described in more detail below, by coagulation, preferably in a heatable nozzle, it is possible to produce a polymer strand which has adhesive properties similar to those of a conventionally produced and dried film adhesive, but with the bond strength developed in a significantly shorter time.

The invention provides a method for coagulating an aqueous polymer dispersion, by providing an aqueous polymer dispersion which comprises at least one polymer in dispersion in aqueous phase and also comprises thermally expandable, thermoplastic microspheres, coagulating the polymer dispersion by energy input, and delivering the coagulated composition via an outlet aperture, preferably in the form of a nozzle.

The energy for the coagulation is input preferably thermally or by shearing, more preferably both thermally and by shearing.

An important constituent of a coating or adhesive-bonding composition (also referred to collectively below as coating composition) is the binder or adhesive-bonding agent (also referred to collectively below as binder). The aqueous coating composition preferably comprises an aqueous polymer dispersion as its binder.

The amount of polymer (binder) in the aqueous dispersion is preferably 20 to 70 wt %, more particularly 50 to 65 wt %.

The polymer dispersed in the aqueous dispersion is obtainable in particular by polymerization of radically polymerizable compounds (monomers), or comprises polymers obtainable by polycondensation, such as polyurethanes, for example. The aqueous polymer dispersion is preferably prepared by emulsion polymerization. Preferably, therefore, the polymer dispersed in the aqueous dispersion is an emulsion polymer.

In the text below, the expression "(meth)acryl . . . " and similar expressions are an abbreviating notation for "acryl . . . or methacryl . . . ".

The polymer consists to an extent of preferably at least 40 wt %, more preferably at least 60 wt %, very preferably at least 80 wt % of what are known as principal monomers. The principal monomers are selected from $C_1$-$C_{20}$ alkyl(meth)acrylates, vinyl esters of carboxylic acids comprising up to 20 C atoms, vinylaromatics having up to 20 C atoms, ethylenically unsaturated nitriles, vinyl halides, vinyl ethers of alcohols comprising 1 to 10 C atoms, aliphatic hydrocarbons having 2 to 8 C atoms and one or two double bonds, or mixtures of these monomers. The dispersed polymer consists to an extent of preferably more than 40 wt % of $C_1$-$C_{20}$ alkyl(meth)acrylates.

Examples include alkyl(meth)acrylates with a $C_1$-$C_{10}$ alkyl radical, such as methyl methacrylate, methyl acrylate, n-butyl acrylate, ethyl acrylate, and 2-ethylhexyl acrylate. Also suitable in particular are mixtures of the alkyl(meth)acrylates. Vinyl esters of carboxylic acids having 1 to 20 C atoms are, for example, vinyl laurate, vinyl stearate, vinyl propionate, Versatic acid vinyl esters, and vinyl acetate. Suitable vinylaromatic compounds include vinyltoluene, alpha- and para-methylstyrene, alpha-butylstyrene, 4-n-butylstyrene, 4-n-decylstyrene, and—preferably—styrene. Examples of nitriles are acrylonitrile and methacrylonitrile. The vinyl halides are ethylenically unsaturated compounds substituted by chlorine, fluorine or bromine, preferably vinyl chloride and vinylidene chloride. Examples of vinyl ethers include vinyl methyl ether and vinyl isobutyl ether. Preferred vinyl ethers are those of alcohols comprising 1 to 4 C atoms. Hydrocarbons having 2 to 8 C atoms and one or two olefinic double bonds include butadiene, isoprene, and chloroprene, ethylene or propylene. Polymers or copolymers obtained from butadiene or isoprene can also be hydrogenated subsequently.

Preferred principal monomers are vinyl esters, preferably vinyl acetate, also in particular in combination with ethylene (vinyl acetate/ethylene copolymers for short), butadiene, also in particular in combination with styrene (butadiene/styrene copolymers for short), and the $C_1$ to $C_{10}$ alkyl(meth)acrylates, more particularly $C_1$ to $C_8$ alkyl(meth)acrylates (polyacrylates for short), with polyacrylates being particularly preferred in each case.

Especially preferred as principal monomers are $C_1$ to $C_{10}$ alkyl(meth)acrylates; mention may be made more particularly of methyl acrylate, ethyl acrylate, n-butyl acrylate, n-hexyl acrylate, octyl acrylate, and 2-ethylhexyl acrylate, and also mixtures of these monomers. The emulsion polymer consists to an extent of preferably more than 40 wt %, more particularly more than 60 wt %, more preferably more than 80 wt % of $C_1$-$C_{20}$ alkyl(meth)acrylates.

Besides the principal monomers, the polymer may include further monomers, examples being monomers with carboxylic acid, sulfonic acid, or phosphonic acid groups. Carboxylic acid groups are preferred. Examples include acrylic acid, methacrylic acid, itaconic acid, maleic acid, or fumaric acid. Further monomers are, for example, monomers also comprising hydroxyl groups, especially $C_1$-$C_{10}$ hydroxyalkyl(meth)acrylates, (meth)acrylamide, and monomers comprising ureido groups such as ureido(meth)acrylates. Further monomers that may be mentioned are in addition phenyloxyethyl glycol mono(meth)acrylate, glycidyl acrylate, glycidyl methacrylate, and amino(meth)acrylates such as 2-aminoethyl(meth)acrylate. Monomers which apart from the double bond also carry further functional groups, for example isocyanate-, amino-, hydroxyl-, amido-, or glycidyl-, may have the effect, for example, of improving the adhesion to substrates. Also contemplated in particular are cyclic lactams such as N-vinylpyrrolidone or N-vinylcaprolactam.

A further group of polymers dispersed in the aqueous polymer dispersion in accordance with the invention are polyurethanes, more particularly polyurethanes which are adhesive at room temperature (20° C.). Contemplated preferably is a polyurethane composed primarily of polyisocyanates, more particularly diisocyanates, and, as coreactants, of polyesterdiols, polyetherdiols, or mixtures thereof. The polyurethane is composed to an extent of preferably at least 40 wt %, more preferably at least 60 wt %, and very preferably at least 80 wt % of diisocyanates, polyetherdiols and/or polyesterdiols. The polyurethane preferably comprises polyesterdiols in an amount of more than 10 wt %, more preferably greater than 30 wt %, more particularly greater than 40 wt % or greater than 50 wt %, very preferably greater than 60 wt %, based on the polyurethane. Polyesterdiols in particular are used as synthesis components. If polyesterdiols are used in a mixture with polyetherdiols, then preferably at least 50 mol %, more preferably at least 80 mol %, very preferably 100 mol % of the mixture of polyesterdiols and polyetherdiols is accounted for by polyesterdiols.

Overall the polyurethane is preferably synthesized from:
a) diisocyanates,
b) diols of which
  b1) 10 to 100 mol %, based on the total amount of the diols (b), have a molecular weight of 500 to 5000 g/mol,
  b2) 0 to 90 mol %, based on the total amount of the diols (b), have a molecular weight of 60 to 500 g/mol,
c) monomers different from the monomers (a) and (b) and having at least one isocyanate group or at least one group which is reactive toward isocyanate groups, and additionally carrying at least one hydrophilic group or one potentially hydrophilic group to render the polyurethane dispersible in water,
d) optionally further compounds, different from the monomers (a) to (c), that are polyvalent and have reactive groups which are alcoholic hydroxyl groups, primary or secondary amino groups, or isocyanate groups, and
e) optionally compounds, different from the monomers (a) to (d), which are monovalent and have a reactive group which is an alcoholic hydroxyl group, a primary or secondary amino group, or an isocyanate group.

The aqueous polymer dispersion or the aqueous binder preferably comprises an adhesive, more preferably a pressure-sensitive adhesive. The term pressure-sensitive adhesive (PSA) refers to an adhesive which is permanently tacky at room temperature (20° C.). A PSA features sufficient adhesion (tack) in conjunction with a necessary cohesion (internal strength within the layer of adhesive).

For adhesives, the glass transition temperature (Tg) of the polymer (binder) is generally less than or equal to +15° C., while for PSAs it is generally and preferably less than or equal to 0° C. The Tg is preferably −65 to +10° C., more preferably −65 to less than or equal to 0° C., very preferably −65 to −10° C., or −65 to −20° C. The glass transition temperature can be determined by means of differential scanning calorimetry (ASTM D 3418-08, midpoint temperature).

The aqueous polymer dispersion further comprises thermally expandable, thermoplastic microspheres. Expandable thermoplastic microspheres comprising a thermoplastic polymer shell and a blowing agent enclosed therein are available commercially under the brand name EXPANCEL®. In such microspheres the blowing agent is generally a liquid having a boiling point not higher than the softening temperature of the thermoplastic polymer shell. The softening temperature of the polymer shell, normally corresponding to its glass transition temperature Tg, is preferably within the range from 0 to 140° C., most preferably from 30 to 100° C. On heating, the blowing agent evaporates and, in so doing, raises the internal pressure, accompanied by a softening of the shell, leading to a considerable enlargement of the microspheres. The temperature at which expansion begins is called Tstart, while the temperature at which maximum expansion is achieved is referred to as Tmax. Tstart for the expandable microspheres is preferably from 40 to 140° C., most preferably from 50 to 100° C. Tmax of the expandable microspheres is higher than Tstart and is preferably from 80 to 200° C., most preferably from 100 to 170° C.

Expandable microspheres are available in a diversity of forms—for example, as dry, free-flowing particles; as an aqueous slurry; or as a partly dewatered, moist cake. Expandable microspheres can be produced by polymerizing ethylenically unsaturated monomers in the presence of a blowing agent. Detailed descriptions of various expandable microspheres and their production are found for example in WO 2004/113613, WO 2007/142593, and in the literature cited therein.

The amount of expandable microspheres in the aqueous dispersion is preferably 0.1 to 20 wt %, more particularly from 0.5 to 10 wt %.

The amount of blowing agent enclosed within the microspheres is preferably from 5 to 50 wt %, or from 10 to 50 wt %, from 15 to 40 wt %, more preferably from 20 to 35 wt %, based on the mass of the microspheres. The blowing agent is generally a liquid having a boiling point not higher than the softening temperature of the thermoplastic polymer shell, and may comprise hydrocarbons such as propane, n-pentane, isopentane, neopentane, butane, isobutane, hexane, isohexane, neohexane, heptane, isoheptane, octane, or isooctane, or mixtures thereof. Apart from these it is also possible for other types of hydrocarbon to be used, such as petroleum ethers, or chlorinated or fluorinated hydrocarbons such as methyl chloride, methylene chloride, dichloroethane, dichloroethylene, trichloroethane, trichloroethylene, trichlorofluoromethane, perfluorinated hydrocarbons, etc. Preferred blowing agents comprise isobutane, alone or in a mixture with one or more other hydrocarbons. The boiling point under atmospheric pressure is preferably in the range from about −50 to about 100° C., most preferably from about −20 to about 50° C., more particularly from about −20 to about 30° C.

The particle size of the unexpanded microspheres, represented as volume median D(0.5), is preferably from 1 to 500 μm, preferably from 5 to 100 μm or from 5 to 40 μm. The particle size may be determined by means for example of laser light scattering. The term "expandable microspheres" relates to expandable microspheres which have not been expanded beforehand—that is, to unexpanded expandable microspheres.

The microspheres can be added to the polymer dispersion in various forms of application: for example, in dried form with a solids content of preferably greater than 95 wt %, or in a moist, not fully dried form with a solids content of preferably 55 to 85 wt %, or in the form of an aqueous slurry with a solids content of preferably 5 to 55 wt % or of 35 to 50 wt %.

The thermoplastic polymer shell of the expandable microspheres may be formed from one or more homopolymers or copolymers obtainable by polymerizing ethylenically unsaturated monomers. Examples of monomers suitable for such polymerization are acrylic esters, such as methyl acrylate or ethyl acrylate; methacrylic esters such as methyl methacrylate, isobornyl methacrylate, or ethyl methacrylate; monomers comprising nitrile groups, such as acrylonitrile, methacrylonitrile, alpha-chloroacrylonitrile, alpha-ethoxyacrylonitrile, fumaronitrile, or crotonitrile; vinyl halides such as vinyl chloride; vinyl esters such as vinyl acetate; vinylpyridine; vinylidene halides, such as vinylidene chloride; styrenes such as styrene, halogenated styrenes, or alpha-methylstyrene; dienes, such as butadiene, isoprene, or chloroprene; vinyl ethers, more particularly those having only one C—C double bond. Examples of vinyl ethers include alkyl vinyl ethers, the alkyl group preferably with 1 to 10 C atoms, most preferably from 1 to 5 C atoms, examples being methyl vinyl ether, ethyl vinyl ether, propyl vinyl ether, isopropyl vinyl ether, butyl vinyl ether, isobutyl vinyl ether, tert-butyl vinyl ether, secbutyl vinyl ether, and mixtures thereof, among which methyl vinyl ether and ethyl vinyl ether are particularly preferred. One or more hydrogen atoms on the alkyl group may be substituted by a functional group, such as hydroxyl, carboxylic acid, amine, ether, etc., an example being ethylene glycol vinyl ether. Any desired mixtures of the abovementioned monomers may likewise be used.

The monomers preferably comprise at least one (meth)acrylic ester monomer, most preferably at least one methacrylic ester such as methyl methacrylate. The amount thereof in the polymer shell is preferably from about 0.1 to about 80 wt %, most preferably from about 1 to about 25 wt % of the total amount of the monomers. The monomers preferably also comprise at least one vinylidene halide, most preferably vinylidene chloride. The amount thereof in the polymer shell is preferably from about 1 to about 90 wt %, most preferably from about 20 to about 80 wt % of the total amount of the monomers. Most preferably the monomers comprise at least one (meth)acrylic ester monomer and at least one vinylidene halide monomer. The monomers preferably comprise at least one nitrile-comprising monomer, most preferably at least one selected from acrylonitrile and methacrylonitrile, more particularly acrylonitrile. The amount thereof in the polymer shell is preferably from about 1 to about 80 wt %, most preferably from about 20 wt % to about 70 wt % of the total amount of the monomers.

In one advantageous embodiment the monomers comprise at least one acrylic ester monomer, at least one vinylidene halide, and at least one nitrile-comprising monomer. The polymer of the shell may for example be a copolymer obtainable from monomers comprising methyl methacrylate in a preferred amount of about 0.1 to about 80 wt %, most preferably from about 1 to about 25 wt % of the total amount of the monomers, vinylidene chloride in a preferred amount of about 1 to about 90 wt %, most preferably from about 20 to about 80 wt % of the total amount of the monomers, and acrylonitrile in a preferred amount of about 1 to about 80 wt %, most preferably from about 20 to about 70 wt % of the total amount of the monomers. Also suitable for the polymer shell are copolymers of monomers comprising 20 to 80 wt % of acrylonitrile and 1 to 70 wt % of vinyl ethers having only one C—C double bond, with the total amount of the acrylonitrile and of the vinyl ether being from 30 to 100 wt %, preferably from 50 to 100 wt %, or from 65 to 100 wt % of the ethylenically unsaturated monomers. The ethylenically unsaturated monomers comprise preferably from 1 to 60 wt %, 1 to 50 wt %, 5 to 50 wt %, or 5 to 30 wt % of vinyl ethers having only one C—C double bond and also preferably from 40 to 80 wt %, most preferably from 50 to 70 wt %, of acrylonitrile, and also preferably, in addition, methacrylonitrile, preferably in an amount of 1 to 50 wt %, most preferably from 5 to 40, and preferably, furthermore, one or more esters of acrylic acid, esters of methacrylic acid, and mixtures thereof, preferably in an amount of 1 to 50 wt %, preferably from 5 to 40 wt %.

The shell of the microspheres is preferably formed from a copolymer of ethylenically unsaturated monomers comprising at least one monomer selected from (meth)acrylic ester monomers, vinylidene halide monomers, acrylonitrile, and vinyl ether monomers. Particularly preferred are copolymers of monomers comprising alkyl(meth)acrylate, vinylidene chloride, and acrylonitrile, or copolymers of monomers comprising at least one vinyl ether monomer and acrylonitrile.

The monomers for the polymer shell may also comprise crosslinking polyfunctional monomers, such as, for example, divinylbenzene, ethylene glycol di(meth)acrylate, di(ethylene glycol)di(meth)acrylate, triethylene glycol di(meth)acrylate, propylene glycol di(meth)acrylate, 1,4-butanediol di(meth)acrylate, 1,6-hexanediol di(meth)acrylate, glycerol di(meth)acrylate, 1,3-butanediol di(meth)acrylate, neopentyl glycol di(meth)acrylate, 1,10-decanediol (meth)acrylate, pentaerythritol tri(meth)acrylate, pentaerythritol tetra(meth)acrylate, dipentaerythritol hexa(meth)acrylate, triallyl formal tri(meth)acrylate, allyl(meth)acrylate, trimethylolpropane tri(meth)acrylate, tributanediol di(meth)acrylate, PEG-200 di(meth)acrylate, PEG-400 di(meth)acrylate, PEG-600 di(meth)acrylate, 3-acryloyloxyglycol monoacrylate, triacryloformal, triallyl isocyanate, triallyl isocyanurate, divinyl ether, ethylene glycol divinyl ether, diethylene glycol divinyl ether, triethylene glycol divinyl ether, tetraethylene glycol divinyl ether, etc. Particularly preferred crosslinking monomers are at least trifunctional, examples being pentaerythritol tri(meth)acrylate, pentaerythritol tetra(meth)acrylate, dipentaerythritol hexa(meth)acrylate, triallyl formal tri(meth)acrylate, trimethylolpropane tri(meth)acrylate, triacryloformal, triallyl isocyanate, and triallyl isocyanurate. The amount of crosslinking functional monomers may be for example from 0.1 to 10 wt %, or 0.1 to 1 wt %, or 0.2 to 0.5 wt %; or from 1 to 3 wt % of the ethylenically unsaturated monomers, with preference being given to 0.1 to 1 wt %, especially in the case of at least trifunctional monomers, and to 1 to 3 wt % in the case of difunctional monomers.

Apart from the polymer shell and the blowing agent, the microspheres may comprise further substances, added for example during their production; generally, in an amount of 0 to 20 wt %, preferably of 1 to 10 wt %. Examples of such substances are solid suspension media, such as, for example, one or more substances selected from starch, crosslinked polymers, agar gum, derivatized cellulose, such as methylcellulose, hydroxylpropylmethylcellulose, carboxymethylcellulose, and hydroxyethylcellulose, for example, silica, colloidal clays such as, for example, chalk and bentonite, and/or one or more salts, oxides, or hydroxides of metals such as Al, Ca, Mg, Ba, Fe, Zn, Ni, and Mn, examples being one or more substances selected from calcium phosphate, calcium carbonate, magnesium hydroxide, barium sulfate, calcium oxalate, and hydroxides of aluminum, iron, zinc, nickel, or manganese. If present, these solid suspension media are normally disposed primarily on the outer surface of the polymer shell.

The expandable microspheres preferably have a shell of thermoplastic polymer with blowing agent, preferably isobutane, enclosed therein, the microspheres enclosing preferably 17 to 40 wt % of blowing agent and having in the unexpanded state a particle size (volume median D(0.5)) of 5 to 40 µm.

The aqueous polymer dispersion (coating composition), more particularly the aqueous pressure-sensitive adhesive (PSA), may consist solely of the polymer (binder) in dispersion in water and of the microspheres, but may also include further adjuvants as well. Those contemplated include, in the case of PSAs, for example, tackifying resins (tackifiers). Tackifiers are, for example, natural resins, such as rosins and their derivatives formed by disproportionation or isomerization, polymerization, dimerization, and/or hydrogenation. The acid groups in these resins may be present in their salt form (with monovalent or polyvalent counterions, for example) or, preferably, in their esterified form. Alcohols used for the esterification may be monohydric or polyhydric. Examples are methanol, ethanediol, diethylene glycol, triethylene glycol, 1,2,3-propanetriol, and pentaerythritol. Preferred tackifiers are natural or chemically modified rosins. Rosins consist predominantly of abietic acid or abietic-acid derivatives. Further additions for increasing the tack (tackifiers) are low molecular weight polymers such as, for example, acid-containing polyacrylates with glass transition temperatures in the range from −60 to −20° C. The low molecular weight polymers which can be used as tackifiers have a weight-average molecular weight of preferably less than 500 000, preferably of 1500 to 45 000 or of 2000 to 20 000, and can be added, for example, in the form of a 100% system to the polymer dispersion. The tackifiers are included preferably in amounts of 1 to 40 wt %, more particularly of 5 to 30 wt %, in the aqueous polymer dispersion. Further additives which may be included in the aqueous dispersion are, for example, antioxidants, fillers, dyes, flow control assistants, and plasticizers.

In preferred polymer dispersions the amount of dispersed polymer is from 20 to 75 wt %, preferably 40 to 70 wt %, the amount of the microspheres is from 0.1 to 20 wt %, preferably 0.5 to 10 wt %, and the total solids content of the aqueous polymer dispersion is 30 to 80 wt %, preferably 40.5 to 80 wt %, or 45 to 75 wt %. This corresponds to a water content of 20 to 70 wt %, or of 20 to 59.5 wt % or of 25 to 55 wt %.

The viscosity of the coating composition prior to coagulation is more particularly 50 to 3000 mPas, more preferably 100 to 2000 mPas. Viscosities are measured according to DIN EN ISO 3219 (23° C., 250 1/s).

To induce coagulation the aqueous polymer dispersions are heated and/or sheared. Particular preference is given to simultaneous heating and shearing. Heating takes place preferably to a temperature of 50 to 150° C., preferably 60 to 110° C. The temperature here is greater than or equal to $T_{start}$ tart of the expanding microspheres. Heating may take place by passage through a heatable outlet aperture, more particularly through a heatable nozzle, or through the introduction of heated gases, more particularly of heated air or of steam.

In the case of shearing, the shear rates are preferably in a range from 100 to 500 000 1/s. Shearing may take place by passage through a microchannel with diameters of preferably 0.5 to 10 mm.

The invention also provides a method in which a polymer dispersion in coagulated form is applied to at least one substrate or in which at least one substrate is coated with polymer dispersion coagulated in accordance with the invention. The polymer dispersion is preferably an adhesive dispersion, which is applied preferably in strand form to at least one substrate. Application of the coagulated coating composition takes place preferably with a nozzle. Coating is performed preferably in a continuous operation. The substrates or carrier materials may preferably be paper, board or card.

In one preferred method the polymer dispersion is an adhesive dispersion which is applied in coagulated form to a sealable region of a cardboard pack, and the cardboard pack is sealed by means of the applied, coagulated adhesive dispersion.

The invention additionally provides coated substrates obtainable by the above-described method for coating substrates with a coagulated polymer dispersion.

The invention further provides the use of thermally expandable, thermoplastic microspheres for coagulating aqueous polymer dispersions.

The advantages afforded by the method of the invention are as follows:

Coagulation of the polymer dispersion produces rapid development of the bond strengths, within the range of that of hotmelt systems. This is not possible via conventional application systems of aqueous PSA dispersions, and so PSA dispersions have hitherto not been amenable to use in carton sealing.

EXAMPLES

Ingredients

PD 1: Aqueous dispersion of an acrylic ester copolymer, prepared by two-stage emulsion polymerization, with polymerization first of 80 parts by weight of a monomer emulsion 1 and then of 20 parts by weight of a monomer emulsion 2.
Monomer emulsion 1: consisting of 90 parts by weight n-butyl acrylate, 2 parts by weight hydroxypropyl acrylate, 6.4 parts by weight methyl methacrylate, and 1.6 parts by weight acrylic acid
Monomer emulsion 2: consisting of 86.5 parts by weight n-butyl acrylate, 2 parts by weight hydroxypropyl acrylate, 3.6 parts by weight glycidyl methacrylate, 6.3 parts by weight methyl methacrylate, and 1.6 parts by weight acrylic acid Solids content=61.9%, Tg=−35° C.

Polymer 1: acResin® 3500; carboxyl-containing poly(n-butyl acrylate), K value about 11-16, solids content=100%

Expancel® 031 DU 40 dry, unexpanded, expandable microspheres, particle size

D(0.5) 10-16 μm; Tstart 80-95° C.; Tmax 120-135° C.

Mixtures are prepared from the aqueous polymer dispersions and the expandable microparticles. The mixtures are subjected to simultaneous heating and shearing by being passed through a heatable capillary. Heating is to a maximum of 120° C. The capillary has a diameter of 1 mm and a length of 175 mm. The shear rate is 150 1/s.

The dispersion undergoes coagulation, as is evident from the formation of an extrudable strand. Particularly advantageous is the formation of a strand (in linear bead form) which, in spite of the residual water that remains, develops not only adhesion to paper and card but also an inner cohesion, thereby counteracting the restorative forces during carton sealing.

Adhesive bonding test: with strand delivery, application takes place to a test paper, against which a further piece of paper is pressed at about 10 N/cm². After about 3-5 seconds, the bond is parted. If adhesion is good and the inner cohesion is developed rapidly, tearing of the paper is observed.

The results are summarized in the table below.

TABLE 1

Test results of polymer dispersions

| Example | Composition | Temperature at the capillary | Result |
|---|---|---|---|
| 1 (comparative) | PD1 0 wt % microspheres | 117° C. | no coagulation no strand formed |
| 2 | PD1 1 wt % microspheres | 104° C. | coagulation, strand formed, some tearing into paper |
| 3 | PD1 1 wt % microspheres 10 wt % polymer 1 | 91° C. | coagulation, strand formed, tearing into paper |

The results show that inventive examples 2 and 3 allow strand delivery and also that the strand produced is able to develop bond strength, thereby enabling the bonding of paper. In contrast, noninventive example 1 does not coagulate and does not produce a strand.

The invention claimed is:

1. A method for coagulating an aqueous polymer dispersion, the method comprising:
    coagulating the aqueous polymer dispersion comprising thermally expandable, thermoplastic microspheres and a polymer in dispersion in an aqueous phase by energy input, thereby obtaining a coagulated composition, wherein the coagulation takes place thermally by heating or the coagulation takes place thermally by heating and simultaneously by shearing; and
    delivering the coagulated composition via an outlet aperture.

2. The method of claim 1, wherein the energy for said coagulating is input thermally.

3. The method of claim 1, wherein the polymer in dispersion is an emulsion polymer or a polyurethane.

4. The method of claim 1, wherein the polymer in dispersion comprises more than 40 wt % of $C_1$-$C_{20}$ alkyl (meth)acrylates.

5. The method of claim 1, wherein the polymer in dispersion has a glass transition temperature of less than or equal to 0° C.

6. The method of claim 1, wherein the aqueous polymer dispersion is an adhesive.

7. The method of claim 1, wherein the aqueous polymer dispersion comprises a tackifier.

8. The method of claim 1, wherein an amount of the polymer in dispersion in the aqueous polymer dispersion is from 20 to 75 wt %, and an amount of the microspheres in the aqueous polymer dispersion is from 0.1 to 20 wt %.

9. The method of claim 1, wherein the microspheres have a shell of a thermoplastic polymer with a blowing agent enclosed therein, and the microspheres in the unexpanded state have a particle size with a volume median D(0.5) of from 5 to 40 μm.

10. The method of claim 9, wherein the shell of the microspheres is formed from a copolymer of ethylenically unsaturated monomers comprising at least one monomer selected from the group consisting of a (meth)acrylic ester monomer, a vinylidene halide monomer, acrylonitrile, and a vinyl ether monomer.

11. The method of claim 9, wherein the shell of the microspheres is formed from a copolymer of monomers comprising alkyl (meth)acrylate, vinylidene chloride, and acrylonitrile, or of monomers comprising a vinyl ether monomer and acrylonitrile.

12. The method of claim 1, wherein the microspheres have an expansion start temperature $T_{start}$ of from 40 to 140° C. and a maximum expansion temperature $T_{max}$ which is higher than $T_{start}$ and is from 80 to 200° C.

13. The method of claim 2, wherein said coagulating takes place thermally by heating to a temperature of from 50 to 150° C., or said coagulating takes place thermally by heating to a temperature of from 50 to 150° C. and simultaneously by shearing with a shear rate of from 100 to 500 000 1/s.

14. The method of claim 1, wherein the coagulated composition is applied to at least one substrate.

15. The method of claim 14, wherein the aqueous polymer dispersion is an adhesive dispersion which is applied in a coagulated form to at least one substrate selected from the group consisting of paper, board, and card.

16. The method of claim 14, wherein the aqueous polymer dispersion is an adhesive dispersion which is applied in a coagulated form to a sealable region of a cardboard pack and the cardboard pack is sealed via the adhesive dispersion.

17. The method of claim 8, wherein a total solids content of the aqueous polymer dispersion is from 30 to 80 wt %.

18. The method of claim 1, wherein the energy for said coagulating is input thermally and by shearing.

* * * * *